(12) United States Patent
Liao et al.

(10) Patent No.: US 7,953,158 B2
(45) Date of Patent: May 31, 2011

(54) COMPUTATION TRANSFORMATIONS FOR STREAMING APPLICATIONS ON MULTIPROCESSORS

(75) Inventors: Shih-wei Liao, Santa Clara, CA (US); Zhaohui Du, Shanghai (CN); Gansha Wu, Beijing (CN); Ken Lueh, Santa Clara, CA (US); Zhiwei Ying, Shanghai (CN); Jinzhan Peng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1568 days.

(21) Appl. No.: 11/170,978

(22) Filed: Jun. 30, 2005

(65) Prior Publication Data
US 2007/0003161 A1 Jan. 4, 2007

(51) Int. Cl.
H04N 7/18 (2006.01)
(52) U.S. Cl. .............. 375/240.26; 375/240.18
(58) Field of Classification Search . 375/240.01–240.29
See application file for complete search history.

(56) References Cited

U.S. PATENT DOCUMENTS

| | | | |
|---|---|---|---|
| 6,615,366 | B1 | 9/2003 | Grochowski et al. |
| 6,772,415 | B1 | 8/2004 | Danckaert et al. |
| 7,086,038 | B2 | 8/2006 | Cronquist et al. |
| 7,308,151 | B2 * | 12/2007 | Munsil et al. ............ 382/252 |
| 7,436,981 | B2 * | 10/2008 | Pace .......................... 382/103 |
| 7,487,497 | B2 | 2/2009 | Ren et al. |
| 2005/0188364 | A1 | 8/2005 | Crockx et al. |
| 2007/0074195 | A1 | 3/2007 | Liao et al. |

FOREIGN PATENT DOCUMENTS

WO WO-2004017207 2/2004

OTHER PUBLICATIONS

Notice of Preliminary Rejection mailed Oct. 27, 2009 and received May 24, 2010 for Korean Patent Application No. 10-2008-7007116.
First Office Action mailed Apr. 7, 2010 for Chinese Application No. 200680034125.X (PCT/US2006/036155).
Amarasinghe, S., et al., "Architectures, Languages, and Compilers for the Streaming Domain", PACT, Sep. 27, 2003.
Anderson et al., Data and Computation Transformation for Multiprocessors, ACM SIGPLAN Notices, ACM, Assoc. for Computer Machinery, NY, NY, USA, vol. 30, No. 8, Aug. 1, 1995, pp. 166-178.
Buck, A Streaming Programming Language, Stanford University, 2001, (2001).
Buck, I. et al., Brook for GPUs: Stream Computing on Graphics Hardware, in Proceedings of SIGGRAPH 2004, Los Angeles, CA, Aug. 2004.
Buck, I. et al., Brook for GPUs: Stream Computing on Graphics Hardware, *Presentation*, Computer Science Department, Stanford Univ. SIGGRAPH 2004.
Buck, I., Brook Language Specification in http://merrimac.stanford.edu/brook, Oct. 2003.

(Continued)

Primary Examiner — Andy S Rao
(74) Attorney, Agent, or Firm — Blakely, Sokoloff, Taylor & Zafman LLP

(57) ABSTRACT

A method including providing a stream of content to a processor, transforming kernels within the stream of content through affine modeling, transforming the affine modeled kernels, stream contracting kernel processes, and stream blocking the kernel processes.

16 Claims, 6 Drawing Sheets

OTHER PUBLICATIONS

Burke, M. et al., Interprocedural Dependence Analysis and Parallelization, in Proceedings of the SIGPLAN '86 Symposium on Compiler Construction, Palo Alto, CA, Jun. 1986.

Office Action for European Patent Application No. 06814800.6-1243; issued Feb. 26, 2009; 5 pages.

Hall, Mary W. et al., Detecting Coarse-Grain Parallelism Using an Interprocedural Parallelizing Compiler, ACM 1995, San Diego, CA, pp. 1-27.

Hall, M. et al., Maximizing Multiprocessor Performance with the SUIF Compiler, in IEEE Computer, vol. 29, Issue 12, Dec. 2009.

Kuo, K., The StreamIt Development Tool: A Programming Environment for StreamIt, Dep't of Electrical Engineering & Computer Science Thesis, MIT, 2004.

Lam, Monica S., A Data Locality Optimizing Algorithm, Computer Systems Laboratory, Stanford University, Conference of Programming Language Design and Implementation (1979-1999: A Selection, 2004., 442-444.

Lam, Monica et al., The Cache Performance and Optimizations of Blocked Algorithms, ASPLOS Proc. Int'l Conf. on Arch Support for Programming Languages & Operating Systems, NY, NY, US, vol. 26, No. 4, Apr. 8, 1991, pp. 63-74., XP002277032, (Apr. 8, 1991).

Lim, et al., Blocking and Array Contraction across Arbitrarily Nested Loops using Affine Partitioning, Proceedings of the Eighth ACM SIGPLAN Symposium on Principles and practices of parallel programming, 2001, 103-112.

Lim et al., Cache Optimizations with Affine Partitioning, Proceedings of the Tenth SIAM Conference on Parallel Processing for Scientific Computing, (Mar. 2001).

Lim et al., Maximizing Parallelism and Minimizing Synchronization with Affine Partitions, Parallel Computing (24), (1998), 445-475.

Lin, Hua et al., A New Approach for Finding Loop Transformation Matrices, Electrical Engineering Department, Texas A&M University, IEEE, 1994., 386-391.

International Preliminary Report on Patentability mailed Apr. 3, 2008 for International Application No. PCT/US2006/036155.

International Search Report and Written Opinion mailed Feb. 6, 2007 for International Application No. PCT/US2006/036155.

Purcell, T. et al., Ray Tracing on Programmable Graphics Hardware, in Proceedings of SIGGRAPH 2002, San Antonio, TX, Jul. 22-26, 2002.

Quillere et al., Generation of Efficient Nested Loops from Polyhedra, International Journal of Parallel Programming, vol. 28, No. 5, Sep. 11, 2000, pp. 469-498.

Rixner, S. et al., A Bandwidth-Efficient Architecture for Media Processing, in Proceedings of the 31st IEEE Micro Conference, Dec. 1998.

Final Office Action mailed Oct. 27, 2009 for U.S. Appl. No. 11/234,484.

First Office Action mailed Jun. 15, 2009 for U.S. Appl. No. 11/234,484.

Wolf et al., A Data Locality Optimizing Algorithm, ACM SIGPLAN Notices, ACM, Association for Computing Machinery, NY, NY, USA, vol. 26, No. 6, Jun. 1991, pp. 30-44., XP002406665.

* cited by examiner

```
Void kernel1(stream in1<>, stream in2<>, out
stream tmp<>)
{
    //the dimensions of in1, in2 and tmp are
    conformable
    For (int i = 0;i < sizeof(tmp);i++)
        tmp[i] = in1[i] * in2[i];
}

Void kernel2(stream tmp<>, stream in3<>, out
stream out1<>)
{
    //the dimensions of tmp, in3 and out1 are
    conformable
    For (int i = 0;i < sizeof(tmp);i++)
        out[i] = tmp[i] + in3[i];
}
```

(a) before contraction

```
Void kernel12(stream in1<>, stream in2<>, out
stream in3<>, out stream out1<>)
{
    //the dimensions of in1, in2 and in3 and out1
    are conformable
    For (int i = 0;i < sizeof(out1);i++) {
        tmp = in1[i] * in2[i];
        out1[i] = tmp + in3[i];
    }
}
```

(b) after contraction

FIG. 4

```
Void kernel123(stream in1<I,J>, stream
in2<I,J>, out stream out1<I,J>)
{
    For (int i = 0; i < I; i++) {
        For (int j = 0; j < J; j++) {
            out1[i,j] = in1[i,j] * in2[i,j];
        }
    }
}
```

(a) before blocking

```
Void kernel123(stream in1<I,J>, stream
in2<I,J>, out stream out1<I,J>)
{
    For (int i = 0; i < I; i += B) {
        For (int j = 0; j < J; j++) {
            For (int k = i; k < i + B; k++) {
                out1[k,j] = in1[k,j] * in2[k,j];
            }
        }
    }
}
```

(b) after blocking

FIG. 5

COMPUTATION TRANSFORMATIONS FOR STREAMING APPLICATIONS ON MULTIPROCESSORS

BACKGROUND

1. Field

The embodiments relate to optimizing stream processing, and more particular to applying affine modeling through transformations and memory optimization.

2. Description of the Related Art

A large percentage of the cycles on the personal computers (PC) are estimated to be spent on streaming applications, such as Moving Pictures Expert Group version 4 (MPEG4) decoding and encoding, raytracing, image processing, data mining, and software radio. Since streaming applications require high priority and uninterrupted processing, optimization of streaming applications and increased computing power is becoming necessary.

To assist with increasing computing power, multiprocessors are becoming prevalent in modern computers. Major CPU vendors are migrating to multi-core processors for use as desktop and server processors. With multiple processors, optimization of streaming applications and parallelism is needed.

BRIEF DESCRIPTION OF THE DRAWINGS

Embodiments are illustrated by way of example and not by way of limitation in the figures of the accompanying drawings in which like references indicate similar elements. It should be noted that references to "an" embodiment in this disclosure are not necessarily to the same embodiment, and they mean at least one.

FIG. 4 illustrates a before and after example of how a kernel process is stream contracted.

FIG. 5 illustrates an example of stream blocking according to one embodiment.

DETAILED DESCRIPTION

The embodiments discussed herein generally relate to a method, system and apparatus for improving streaming processing by applying affine partioning modeling through transformations and memory optimization for streaming processes. Referring to the figures, exemplary embodiments will now be described. The exemplary embodiments are provided to illustrate the embodiments and should not be construed as limiting the scope of the embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Figure 1:
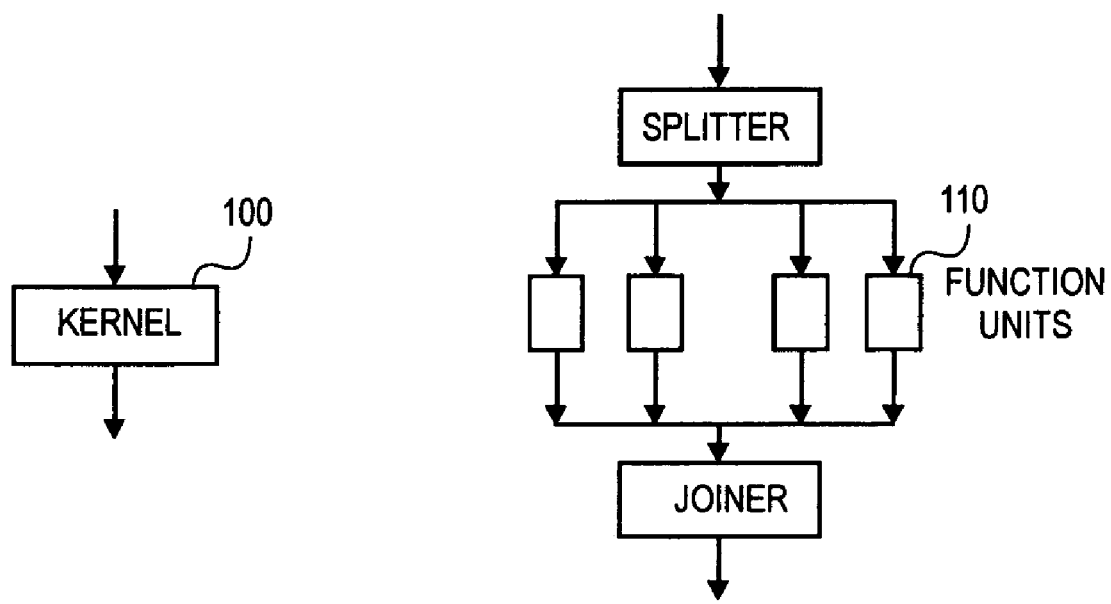
FIG. 1 illustrates data parallelism that occurs inside a kernel.

FIG. 1 illustrates data parallelism that occurs inside a kernel. A kernel (e.g., kernel 100) is equivalent to a split-join construct semantically (as illustrated in FIG. 1). Therefore the boundaries of the kernel introduces unnecessary barriers in a computation path. A stream is a collection of units, or stream elements, which can be operated on in parallel. Kernels are the language construct to enforce data parallelism, i.e., kernels can be mapped to multiple identical function units (i.e., function units 110) that operate over the elements of input streams independently. In a streaming model each function unit, associated with a specific kernel, can only access the current element of an input stream (an exception is if the input stream is a gather-stream, on which the kernel can access randomly; but the gather-stream is read-only, and it doesn't introduce data dependencies between two functional units). This isolation of data and computation enables aggressive compiler optimizations.

Many streaming workloads have load imbalances for computations on various streaming elements. The imbalances lead to waste of computation power and unnecessary synchronization overhead. This fact reflects the inefficiency of intra-kernel parallelism. In certain scenarios, multiple kernels may run sequentially. The intra-kernel data parallelism may not be optimal for these scenarios due to poor locality and overly-small granularity. Therefore, in one embodiment cross-kernel computation transformations are applied to achieve optimal performance.

It should be noted that computer languages, such as the C language, have features that hinder compiler optimizations, such as aliasing and dynamic memory allocation. These features, however, are absent or are restricted in streaming languages. Therefore, in one embodiment a compiler can safely perform aggressive optimizations at the cross-kernel scope, such as inter-kernel statement/iteration reorganization and parallelization across kernels.

In one embodiment, affine modeling is used to transform a content stream made up of kernels. In this embodiment, the basis for applying affine modeling is that each kernel is treated as an implicit loop over stream elements. Many loop transformations can be used to improve parallelization as well as the memory subsystem performance. The affine partition framework unifies transformations, such as unimodular transformations (interchange, skew and reversal), fusion, fission, re-indexing, scaling, and statement reordering.

In one embodiment, for loops transformed from stream kernels, affine partitioning is applied to maximize the degree of parallelism while minimizing the degree of synchronization. This improves the data locality of multiprocessor programs and maximizes the opportunity of array contraction and blocking. In one embodiment, affine modeling includes: modeling data dependencies; applying affine transformations; and applying memory optimizations by blocking and contraction.

For modeling data dependencies, computation transformations must satisfy data dependence constraints. In one embodiment affine theory is applied to model implicit loops that appear with kernels. In this embodiment, the affine application is straightforward for streaming programs, as most kernels can be transformed to "DO ALL" loops without loop-carried dependences. Thus, no synchronization between loop iterations is necessary for most cases. Distinguishable, the Brook language stream Stencil operator (I. Buck, Brook Language Specification, http://merrimac.stanford.edu/brook, October 2003, "Brook"), computes on the elements in a sliding window, and can result in loop-carried dependences. Stencil computations are commonly used in iterative schemes. The resulting loop-carried dependencies, however, are near-neighbor dependencies, and can be modeled in affine theory without difficulty. In one embodiment affine mapping is carried out at the statement level. The mapping results in optimal performance if it is synchronization-free.

In one embodiment, after modeling data dependencies, affine transformations are applied. It should be noted that intra-kernel data parallelism is oftentimes sub-optimal for exploiting performance on a multiprocessor. This is due to the partition by computation philosophy enforced in streaming programs. One kernel performs a very fine-grained computation over all data elements, and then another kernel follows with computing on the same set of data. The cache memory is swept again and again in small intervals; poor data locality and fine computation granularity result in poor efficiency.

In one embodiment, kernel fusion is used to break the barriers between kernels while the dependence analysis results remain valid. Kernel fusion is natural for streaming programs because kernels are stateless, and are connected with a stream having conformable shapes. Furthermore, there is no scalar code or pointer code between kernels to induce dependencies. Kernel fusion generates much a bigger computation scope. In one embodiment aggressive transformations are applied with the unifying framework provided by affine transforms. In one embodiment, the individual transformations include unimodular transformations (interchange, skew and reversal), fusion, distribution, re-indexing, scaling, and statement reordering.

In the above embodiment, no phase ordering problem exists. The individual transformations, such as fusion and unimodular, are subsumed by the affine framework. In one embodiment, for some Brook programming workloads, unimodular transformations (e.g., interchange) must follow fusion and contraction. In some prior art compilers, ordering of unimodular, fusion, followed by contraction will miss critical optimization opportunities. In one embodiment the phase ordering issue is overcome and this embodiment outperforms the prior art compilers by using critical optimization.

Figure 2A:
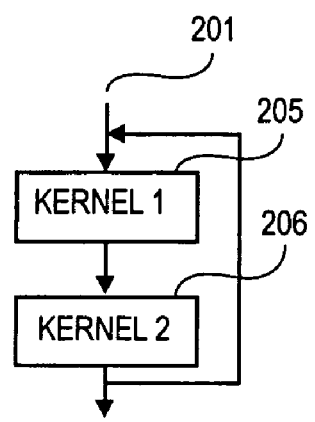
FIG. 2A illustrates an example of a portion of a stream including a first kernel and a second kernel.
Figure 2B:
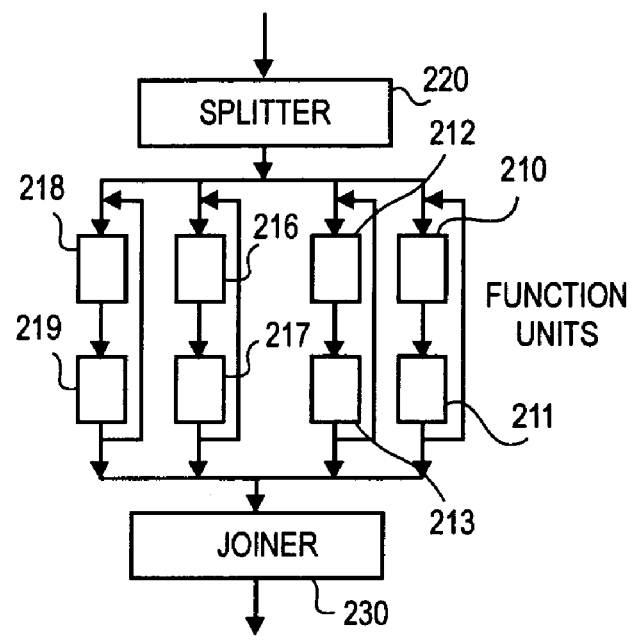
FIG. 2B illustrates transformation of the kernels in FIG. 2A according to one embodiment.

FIG. 2A illustrates an example of a portion of a stream 201 includes a first kernel 205 and a second kernel 206. In one embodiment, as illustrated in FIG. 2B the kernels are transformed into a more optimized computation sequence by applying kernel fusion followed by loop interchange. This transformation not only increases the computation granularity, but also improves data locality. As illustrated, splitter 220 splits kernel 205 into function units 210, 211, 212 and 213, and splits kernel 206 into function units 216, 217, 218 and 219. After the function units are processed joiner 230 rejoins the function units.

Figure 3:
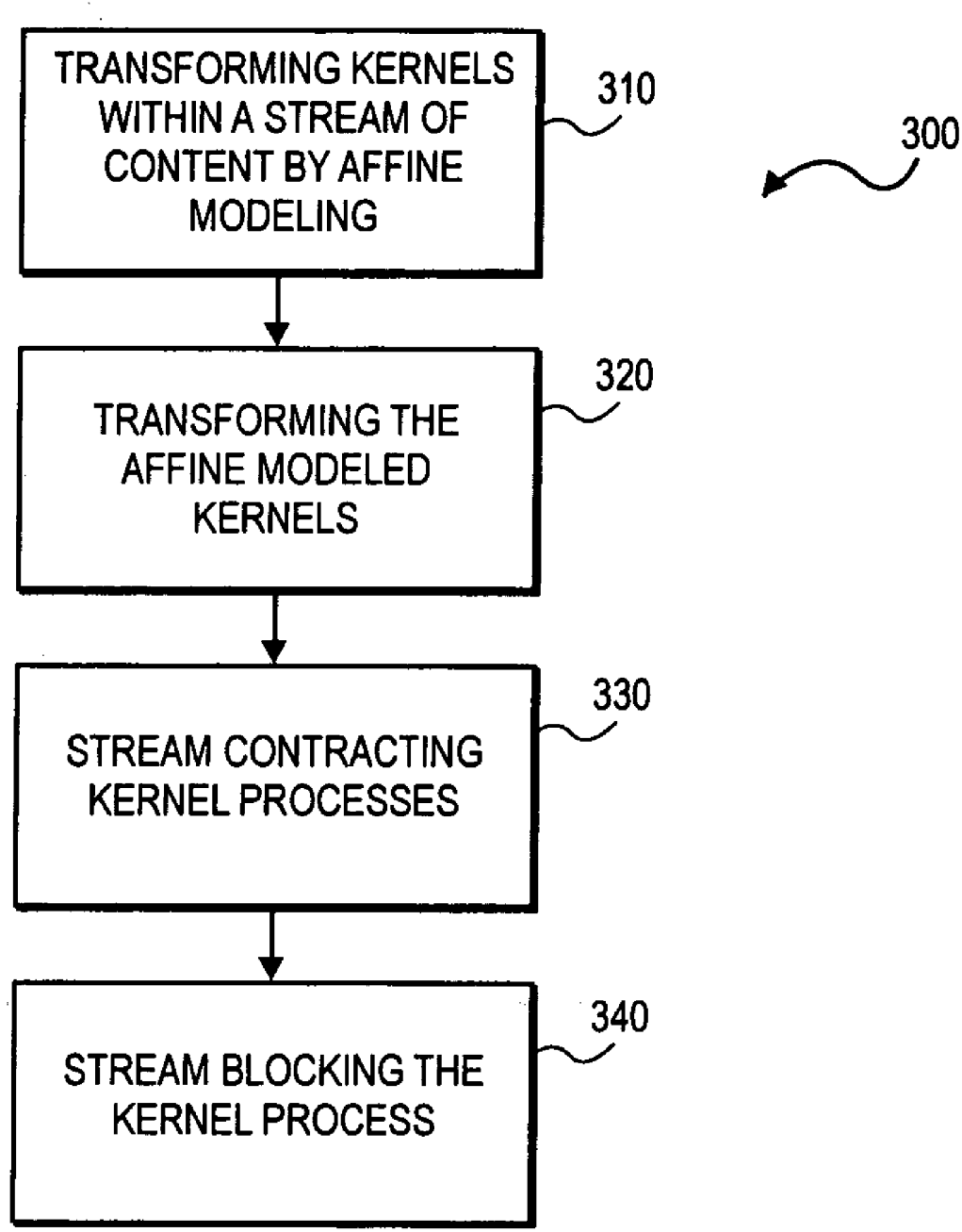
FIG. 3 illustrates a block diagram of an embodiment including a process for applying affine modeling, transformations, stream contracting and stream blocking.

FIG. 3 illustrates a block diagram of an embodiment including a process for applying affine modeling, transformations, stream contracting and stream blocking. In block 310 kernels included in a content stream are transformed by affine modeling. In block 310, the affine modeled kernels are transformed by fusion transforming the affine modeled kernels; unimodular transforming the affine modeled kernels; distribution transforming the affine modeled kernels; indexing the affine modeled kernels; scaling the affine modeled kernels; and statement reordering transforming the affine modeled kernels.

In one embodiment the kernels are loop interchanged after fusion transforming. In this embodiment the loop interchanging increases computation granularity and improves data locality. In one embodiment transforming further include converting the kernels to loop processes. Process 300 continues with block 330 where stream contracting is performed (see FIG. 4) for kernel processes.

Process 300 continues with block 340 where stream blocking is performed for kernel processes (see FIG. 5). In process 300 stream contracting and stream blocking reduces memory size used to process kernel processes. In this embodiment, since the kernel processes required memory for computations is reduced, the computations on the kernel processes can be performed in cache memory.

FIG. 4 illustrates a before and after example of how a kernel process is stream contracted. As illustrated, the left side of FIG. 4 shows an uncontracted stream process. The right side of FIG. 4 illustrates a stream process after contraction. By including the second For loop in one For loop (i.e., contracting the stream tmp into a single element), higher performance is achieved from the smaller memory footprint. From the example, it is also easily seen that kernel fusion, as part of the affine partitioning framework, is oftentimes needed to enable stream contraction. Stream contraction is natural for streaming programs because the conformable shapes for the streams in a kernel have corresponding one-to-one mapping. Even when there is loop-carried dependence along with stencil operations, it is near-neighbor dependence and the size of the contracted array is the distance between near-neighbor dependence, which is small.

Stream blocking improves data locality, especially with the presence of imperfect nested loops. FIG. 5 illustrates an example of how stream blocking works. The left side of FIG. 5 illustrates a stream process before blocking. The right side of FIG. 5 illustrates a stream process after blocking. The transformation partitions the rows of streams into blocks with size of B, and computes elements within the same block in the temporal neighborhood. When B is appropriately specified, the computation within the neighborhood can fit in cache memory of a processor (e.g., central processing unit) and boosts performance.

Figure 6:
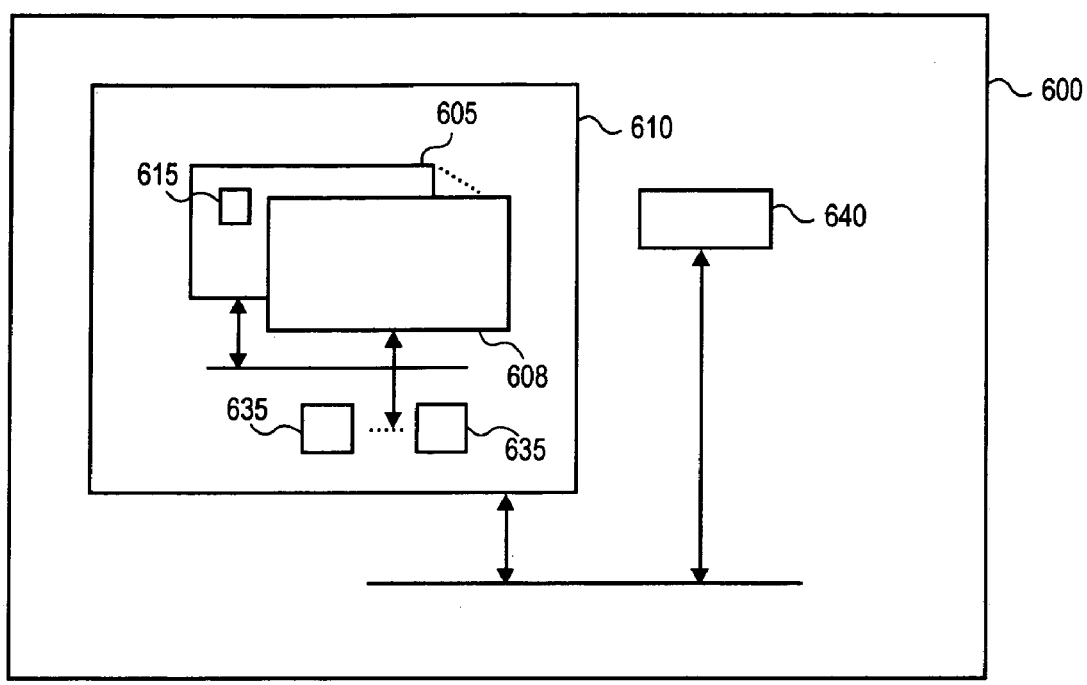
FIG. 6 an embodiment of a system.

FIG. 6 illustrates an embodiment of a system. System 600 includes a set 610 including processor 610 connected to first memory 635. In one embodiment, multiple processors are connected together, such as processor 608. In one embodiment, multiple memories 635 are connected to processor 610. In one embodiment, memory 635 is cache memory. Second memory 640 is connected to processor 635. In one embodiment second memory 640 is of a type, such as random-access memory (RAM), static random access memory (SRAM), dynamic random access memory (DRAM), synchronous DRAM (SDRAM), read-only memory (ROM), etc.

In one embodiment process 615 is to run in processor 605. In one embodiment the transformed kernel processes run in the memory 635. Process 615 transforms kernels within a content stream through affine modeling. Process 615 stream contracts kernel processes, and stream blocks the kernel processes. In one embodiment process 615 applies fusion transforms to the affine modeled kernels. In another embodiment process 615 applies loop interchanging to the kernels after fusion transforming the kernels. In one embodiment process 615 converts the kernels to loop processes.

In one embodiment affine modeling includes splitting the kernels, performing stream operations on the split kernels, and joining the results of the stream operations on the split kernels.

In one embodiment the affine mapping is at the statement-level, and it can further align the computation to reduce memory footprint, which is especially important for streaming performance. In this embodiment the transformations are unified in the model, therefore there are no phase ordering issues. For some streaming workloads, the classical ordering of unimodular, fusion, followed by contraction will miss critical optimization opportunities that the above embodiments having a unifying framework can naturally catch.

Some embodiments can also be stored on a device or machine-readable medium and be read by a machine to perform (i.e., to execute) instructions (i.e., machine executable instructions). The machine-readable medium includes any mechanism that provides (i.e., stores and/or transmits) information in a form readable (i.e., executable) by a machine (e.g., a computer, PDA, cellular telephone, etc.). The machine-readable medium is thus also referred to as a computer-readable storage medium to store computer executable instructions encoded thereon. For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   providing a stream of content to a processor, the stream of content having a plurality of kernels; and
   applying affine modeling to the plurality of kernels within the stream of content wherein affine modeling comprises:
   modeling data dependencies in loops within the plurality of kernels;
   applying affine transformation to the plurality of kernels to convert the plurality of kernels to loop processes, wherein affine transformation is applied in response to modeling data dependencies in the loops within the plurality of kernels;
   applying stream contracting to the plurality of kernels in response to applying affine transformation; and
   applying stream blocking to the plurality of kernels in response to applying stream contracting.

2. The method of claim 1, wherein applying affine transformation includes:
   fusion transforming the affine modeled plurality of kernels.

3. The method of claim 2 further comprising:
   unimodular transforming the affine modeled plurality of kernels;
   distribution transforming the affine modeled plurality of kernels;
   indexing the affine modeled plurality of kernels;
   scaling the affine modeled plurality of kernels; and
   statement reordering transforming the affine modeled plurality of kernels.

4. The method of claim 2 further comprising:
   loop interchanging the plurality of kernels after fusion transforming the affine modeled plurality of kernels, wherein loop interchanging increases computation granularity and improves data locality.

5. The method of claim 1, wherein stream contracting and stream blocking cause reduction in memory size for processing the plurality of kernels.

6. The method of claim 1, wherein affine modeling comprises:
   splitting the plurality of kernels;
   performing stream operations on the split plurality of kernels; and
   joining the results of the stream operations on the split plurality of kernels.

7. A computer-readable storage medium having computer executable instructions encoded thereon that, when executed, cause a computer to perform a method, the method comprising:
   providing a stream of content to a processor, the stream of content having a plurality of kernels; and
   applying affine modeling to the plurality of kernels within the content stream, wherein affine modeling comprises:
   modeling data dependencies in loops within the plurality of kernels;
   applying affine transformation to the plurality of kernels to convert the plurality of kernels to loop processes, wherein affine transformation is applied in response to modeling data dependencies in the loops within the plurality of kernels;
   applying stream contracting to the plurality of kernels in response to applying affine transformation; and
   applying stream blocking to the plurality of kernels in response to applying stream contracting.

8. The computer-readable storage medium of claim 7, wherein applying affine transformation comprises executing further computer executable instructions encoded thereon that when executed cause the computer to perform a further method comprising:
   unimodular transforming the affine modeled plurality of kernels;
   distribution transforming the affine modeled plurality of kernels;
   indexing the affine modeled plurality of kernels;
   scaling the affine modeled plurality of kernels; and
   statement reordering transform the affine modeled plurality of kernels.

9. The computer-readable storage medium of claim 7, having further computer executable instructions encoded thereon that, when executed, cause the computer to:
   loop interchange the plurality of kernels after applying affine transformation.

10. The computer-readable storage medium of claim 7, wherein the affine modeling comprises executing further computer executable instructions encoded thereon that when executed cause the computer to perform a further method comprising:
    splitting the plurality of kernels;
    performing stream operations on the split plurality of kernels; and
    joining the results of the stream operations on the split plurality of kernels.

11. A system comprising:
    a first processor coupled to a first memory;
    a second memory coupled to the first processor; and a process to run in the first processor, the process to:
  provide a stream of content to the first processor, the stream of content having a plurality of kernels; and
  apply affine modeling to the plurality of kernels within the stream of content, wherein affine modeling comprises:
    modeling data dependencies in loops within the plurality of kernels;
    applying affine transformation to the plurality of kernels to convert the plurality of kernels to loop processes, wherein affine transformation is applied in response to modeling data dependencies in the loops within the plurality of kernels;
    applying stream contracting to the plurality of kernels in response to applying affine transformation; and
    applying stream blocking to the plurality of kernels in response to applying stream contracting.

12. The system of claim 11, wherein the process to apply affine transformation by applying fusion transformation to the affine modeled plurality of kernels.

13. The system of claim 12, wherein the process to apply loop interchanging to the plurality of kernels after applying the fusion transformation.

14. The system of claim 11, wherein the first memory is a cache memory.

15. The system of claim 11, wherein affine modeling comprises:
  splitting the plurality of kernels;
  performing stream operations on the split plurality of kernels; and
  joining the results of the operations on the split plurality of kernels.

16. The system of claim 11 further comprising:
a second processor coupled to a third memory; and
a second process to run in the second processor, the second process to:
  provide another stream of content to the second processor, the other stream of content having a plurality of kernels; and
  apply affine modeling to the plurality of kernels within the other stream of content, wherein affine modeling comprises:
    modeling data dependencies in loops within the plurality of kernels of the other stream of content;
    applying affine transformation to the plurality of kernels to convert the plurality of kernels to loop processes, wherein affine transformation is applied in response to modeling data dependencies in the loops within the plurality of kernels of the other stream of content;
    applying stream contracting to the plurality of kernels of the other stream of content in response to applying affine transformation; and
    applying stream blocking to the plurality of kernels of the other stream of content in response to applying stream contracting.

* * * * *